(12) United States Patent
Matsui et al.

(10) Patent No.: US 9,381,908 B2
(45) Date of Patent: Jul. 5, 2016

(54) HYBRID VEHICLE CONTROL DEVICE

(71) Applicant: Nissan Motor Co., Ltd., Kanagawa (JP)

(72) Inventors: Hiroki Matsui, Kanagawa (JP); Masaki Ueda, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 14/655,579

(22) PCT Filed: Dec. 20, 2013

(86) PCT No.: PCT/JP2013/084343
§ 371 (c)(1),
(2) Date: Jun. 25, 2015

(87) PCT Pub. No.: WO2014/103962
PCT Pub. Date: Jul. 3, 2014

(65) Prior Publication Data
US 2015/0353070 A1 Dec. 10, 2015

(30) Foreign Application Priority Data
Dec. 25, 2012 (JP) .................................. 2012-280503

(51) Int. Cl.
*B60L 11/00* (2006.01)
*B60W 10/00* (2006.01)
*B60W 20/00* (2016.01)
*B60W 10/02* (2006.01)
(Continued)

(52) U.S. Cl.
CPC ................ *B60W 20/10* (2013.01); *B60K 6/387* (2013.01); *B60K 6/46* (2013.01); *B60K 6/48* (2013.01);
(Continued)

(58) Field of Classification Search
CPC ... B60W 10/026; B60W 20/40; B60W 10/08; B60W 10/196; B60W 20/1062; B60W 2520/10; B60W 10/06; B60W 20/10; B60W 2540/10; B60W 10/025; B60W 2710/027; B60W 2710/06; B60K 6/44; B60K 6/485

USPC .................. 701/1, 22, 60, 61, 64, 65, 66, 67; 180/65.28, 65.1, 65.21, 65.265–65.29; 477/5, 6, 8, 13, 39, 57, 62, 70–88, 477/166–181; 340/995.1, 995.19; 903/930, 903/946
See application file for complete search history.

(56) References Cited

U.S. PATENT DOCUMENTS

| | | | |
|---|---|---|---|
| 7,073,616 B2 * | 7/2006 | Itoh ........................ | B60K 6/485 180/197 |
| 8,265,840 B2 * | 9/2012 | Watanabe ............. | F16H 61/108 477/109 |

(Continued)

FOREIGN PATENT DOCUMENTS

| JP | 2007-069817 | * | 3/2007 |
|---|---|---|---|
| JP | 2007-069817 A | | 3/2007 |

(Continued)

OTHER PUBLICATIONS

International Preliminary Report on Patentability from PCT/JP2013/084343 issued on Mar. 25, 2015 (4 pages).

*Primary Examiner* — Muhammad Shafi
(74) *Attorney, Agent, or Firm* — Osha Liang LLP

(57) ABSTRACT

A hybrid vehicle control apparatus includes a first clutch disposed between an engine and a motor, and a second clutch disposed between the motor and a driving wheel. A lockup controller performs a lockup operation to shift the second clutch from slip state into completely engaged state when a predetermined lockup condition is satisfied under a condition that the second clutch is in the slip state. A second clutch transmitted torque capacity controller performs a lockup-condition second clutch control to control transmitted torque capacity of the second clutch to a value higher by a set quantity than an input torque to the second clutch while the lockup operation is being performed. The input torque corresponds to a state of depression of an accelerator pedal during the shifting of the second clutch from the slip state into the completely engaged state.

7 Claims, 13 Drawing Sheets

(51) Int. Cl.
  *B60W 10/06* (2006.01)
  *B60K 6/46* (2007.10)
  *B60K 6/387* (2007.10)
  *B60K 6/48* (2007.10)
  *B60K 6/547* (2007.10)

(52) U.S. Cl.
  CPC ............... *B60K 6/547* (2013.01); *B60W 10/02* (2013.01); *B60W 10/026* (2013.01); *B60W 10/06* (2013.01); *B60W 20/00* (2013.01); *B60W 20/40* (2013.01); *B60W 2510/0241* (2013.01); *B60W 2540/10* (2013.01); *B60W 2710/025* (2013.01); *B60W 2710/027* (2013.01); *B60W 2710/06* (2013.01); *B60Y 2300/429* (2013.01); *Y02T 10/6221* (2013.01); *Y10S 903/93* (2013.01); *Y10S 903/946* (2013.01)

(56) References Cited

U.S. PATENT DOCUMENTS

| | | | |
|---|---|---|---|
| 2009/0271081 A1* | 10/2009 | Watanabe | F16H 61/08 701/60 |
| 2012/0059542 A1 | 3/2012 | Kawai et al. | |

FOREIGN PATENT DOCUMENTS

| | | | |
|---|---|---|---|
| JP | 2010-139003 | * | 12/2008 |
| JP | 2011-020543 | * | 2/2011 |
| JP | 2011-020543 A | | 2/2011 |
| JP | 2012-056362 | * | 3/2012 |
| JP | 2012-056362 A | | 3/2012 |

* cited by examiner

HYBRID VEHICLE CONTROL DEVICE

CROSS-REFERENCE TO RELATED APPLICATIONS

The present application is a national stage application of PCT/JP2013/084343 filed Dec. 20, 2013, and claims priority to Japanese Patent Application 2012-280503 filed with the Japanese Patent Office on Dec. 25, 2012. the disclosure of which are incorporated herein by reference in their entirety.

BACKGROUND

1. Technical Field

The present invention relates generally to a hybrid vehicle control apparatus, and particularly to an engagement control of a second clutch disposed in a driveline between a drive source and a driving wheel.

2. Related Art

Conventionally, a hybrid vehicle is known which includes a first clutch capable of varying a transmitted torque capacity between an engine and a motor as drive sources, and a second clutch capable of varying a transmitted torque capacity between the motor and a driving wheel side (see a patent document 1. for example). In this conventional art, an engine start control is performed during a shift from an EV mode to an HEV mode, wherein the EV mode is a mode where the vehicle is driven only by a driving force of the motor, and wherein the HEV mode is a mode where the vehicle is driven by both of driving forces of the engine and the motor with the engine started, as follows. In the engine start control, the second clutch is first made to slip, and the driving torque of the motor is made to rise, and the first clutch is thereafter engaged to crank the engine. As the engine rotational speed rises thereafter so that the differential rotation of the first clutch converges, the first clutch is controlled toward complete engagement, and the second clutch is controlled from slip state into completely engaged state.

Patent Document 1: JP 2007-069817 A

SUMMARY OF THE INVENTION

However, in the conventional art described above, when a driver loosens an accelerator while the second clutch is being controlled from slip state into completely engaged state, an input torque to the second clutch rapidly decreases so that the second clutch becomes engaged rapidly, and thereby generates a shock.

One or more embodiments of the present invention provides a hybrid vehicle control apparatus capable of suppressing a shock when a clutch input torque decreases while a second clutch is being controlled from slip state into completely engaged state.

According to one or more embodiments of the present invention, a hybrid vehicle control apparatus comprises: an engine and a motor as drive sources of a vehicle; a first clutch disposed between the engine and the motor; a second clutch disposed between the motor and a driving wheel; a lockup control part configured to perform a lockup operation to shift the second clutch from slip state into completely engaged state when a predetermined lockup condition is satisfied under a condition that the second clutch is in the slip state; and a second clutch transmitted torque capacity control part included in the lockup control part, and configured to perform a lockup-condition second clutch control to control transmitted torque capacity of the second clutch to a value higher by a set quantity than an input torque to the second clutch during the shifting.

According to one or more embodiments of the present invention, while the lockup control part performs the lockup operation to shift the second clutch from slip state into completely engaged state, the second clutch transmitted torque capacity control part performs the lockup-condition second clutch control to control the transmitted torque capacity of the second clutch to the value higher by the set quantity than the input torque to the second clutch. Thereby, when a driver loosens depression of an accelerator pedal while the lockup operation is being performed, the transmitted torque capacity of the second clutch is controlled to the value higher by the set quantity than the input torque although the transmitted torque capacity decreases along with the input torque. Accordingly, even when the input torque decreases, the second clutch is suppressed from causing an engagement shock by rapid convergence of slip as in a case where the transmitted torque capacity of the second clutch is configured to be simply increased at a constant increase rate.

DETAILED DESCRIPTION

Embodiments of the present invention with be described below, with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First, the following describes configuration of a hybrid vehicle control apparatus according to one or more embodiments of the present invention as in [Powertrain System Configuration], [Control System Configuration], [Integrated Controller Configuration], and [Operation Configuration of Engine Start Control Section].

Figure 1:
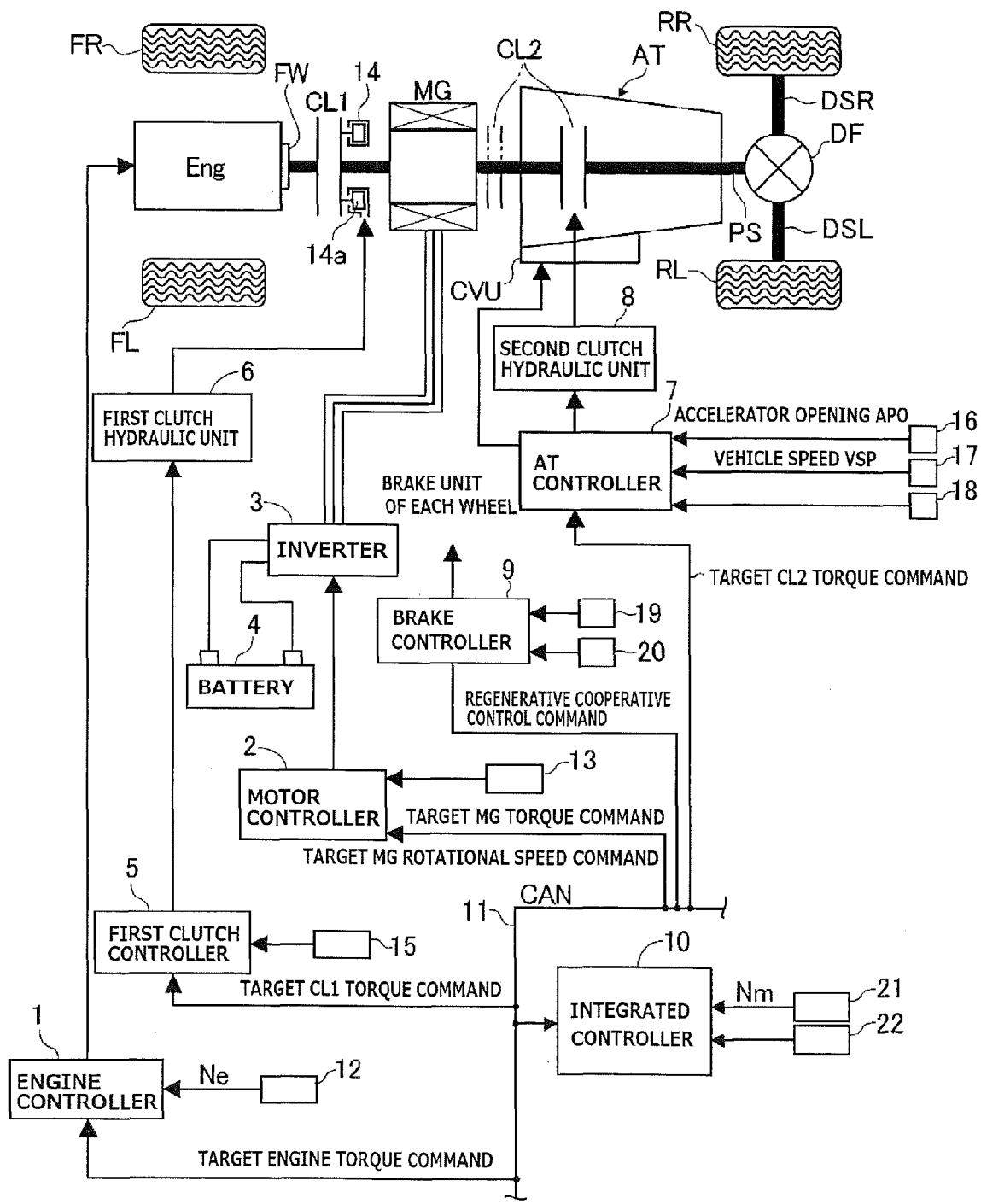
FIG. 1 is a powertrain system configuration diagram showing a powertrain system of a hybrid vehicle to which a hybrid vehicle control apparatus according to one or more embodiments of the present invention is applied.

[Powertrain System Configuration] First, the following describes configuration of a powertrain system of a hybrid vehicle according to one or more embodiments of the present invention. FIG. 1 is a whole system diagram showing the hybrid vehicle of one or more embodiments of the present invention based on rear wheel drive, to which a driving torque control apparatus of the hybrid vehicle is applied.

As shown in FIG. 1, the hybrid vehicle of one or more embodiments of the present invention includes a driveline which includes an engine "Eng", a flywheel "FW", a first clutch CL1, a motor generator "MG", a second clutch CL2, an automatic transmission "AT", a propeller shaft "PS", a differential gear "DF", a left drive shaft "DSL", a right drive shaft "DSR", a left rear wheel "RL" (driving wheel), a right rear wheel "RR" (driving wheel), a left front wheel "FL", and a right front wheel "FR".

Engine Eng is a gasoline engine or diesel engine, which is controlled based on an engine control command from an engine controller 1 so that an engine start control, an engine stop control, and a throttle valve opening control are performed. Flywheel FW is attached to an output shaft of the engine.

First clutch CL1 is arranged between engine Eng and motor generator MG, and is controlled to be engaged or disengaged (or half-engaged) by a first clutch control hydraulic pressure that is produced by a first clutch hydraulic unit 6 based on a first clutch control command from a first clutch controller 5. For example, first clutch CL1 is implemented by a dry type single plate clutch whose engagement and disengagement are controlled by a hydraulic actuator 14 including a piston 14a.

Motor generator MG is a synchronous motor generator in which a permanent magnet is embedded in a rotor and a stator coil is wounded around a stator. Motor generator MG is controlled based on a control command from a motor controller 2 so that three phase alternating currents are generated and applied to motor generator MG by an inverter 3. Motor generator MG can function as an electric motor that rotates based on power supply from a battery 4 (this state henceforth called "power running"), and function also as an electric generator to charge battery 4 by generating an electromotive force between ends of the stator coil when the rotor receives a rotational energy from engine Eng and the driving wheels (this operating state henceforth called "regeneration"). The rotor of motor generator MG is coupled to a transmission input shaft of automatic transmission AT through a damper.

Second clutch CL2 is arranged between motor generator MG and left and right rear wheels RL, RR. Second clutch CL2 is controlled to be engaged or disengaged (including "slip-engaged" and "slip-disengaged") by a control hydraulic pressure that is produced by a second clutch hydraulic unit 8 based on a second clutch control command from an AT controller 7. For example, second clutch CL2 is implemented by a wet type multiplate clutch or brake, wherein the flow rate and hydraulic pressure of working fluid can be controlled continuously by a proportional solenoid valve. First clutch hydraulic unit 6 and second clutch hydraulic unit 8 are installed in an AT hydraulic pressure control valve unit "CVU" that is provided with automatic transmission AT.

Automatic transmission AT is a stepwise variable transmission which automatically shifts among a plurality of stepwise gear positions such as five forward gear positions and one reverse gear position, depending on vehicle speed, accelerator opening, etc. Accordingly, second clutch CL2 is not a newly added special clutch, but is a suitably selected one of clutches and brakes among a plurality of friction engagement elements configured to be engaged in each gear position in a torque transmission path in automatic transmission AT. Alternatively, second clutch CL2 may be a special clutch disposed between motor generator MG and automatic transmission AT or between automatic transmission AT and the driving wheels (left and right rear wheels RL, RR) as indicated by a two-dot chain line in FIG. 1, not one of the friction engagement elements of automatic transmission AT.

An output shaft of automatic transmission AT is coupled to left and right rear wheels RL, RR through propeller shaft PS, differential gear DF, left drive shaft DSL, and right drive shaft DSR.

[Control System Configuration] The following describes a control system of the hybrid vehicle. As shown in FIG. 1, the control system of the hybrid vehicle according to one or more embodiments of the present invention includes engine controller 1, motor controller 2, inverter 3, battery 4, first clutch controller 5, first clutch hydraulic unit 6, AT controller 7, second clutch hydraulic unit 8, a brake controller 9, and an integrated controller 10. Engine controller 1, motor controller 2, first clutch controller 5, AT controller 7, brake controller 9, and integrated controller 10 are connected through a CAN communication line 11 for exchanging information with each other.

Engine controller 1 receives input of information about engine rotational speed from an engine rotational speed sensor 12, and input of a target engine torque command from integrated controller 10, and input of other necessary information. Engine controller 1 outputs a command for controlling an engine operating point (Ne, Te), to a throttle valve actuator of engine Eng and others.

Motor controller 2 receives input of information from a resolver 13 that senses a rotor angular position of motor generator MG, and input of a target MG torque command and a target MG rotational speed command from integrated controller 10, and input of other necessary information. Motor controller 2 outputs to inverter 3 a command for controlling a motor operating point (Nm, Tm) of motor generator MG. Motor controller 2 monitors the battery SOC indicating the state of charging of battery 4, and provides the battery SOC information to integrated controller 10 through CAN communication line 11, wherein the battery SOC information is used also as control information about motor generator MG.

First clutch controller 5 receives input of sensor information from a first clutch stroke sensor 15 that senses the stroke position of piston 14a of hydraulic actuator 14, and input of a target CL1 torque command from integrated controller 10, and input of other necessary information. First clutch controller 5 outputs a command for controlling engagement and disengagement of first clutch CL1, to first clutch hydraulic unit 6 in AT hydraulic pressure control valve unit CVU.

AT controller 7 receives input of information from an accelerator opening sensor 16, a vehicle speed sensor 17, other sensors, etc. (a transmission input rotational speed sensor, an inhibitor switch, etc.) 18. When the vehicle is running with a D range selected, an optimal gear position is found based on the position of an operating point in a shift map, wherein the operating point is defined by an accelerator opening APO and a vehicle speed VSP, and a control command for obtaining the found gear position is outputted to AT hydraulic pressure control valve unit CVU. In addition to this automatic shift control, if the target CL2 torque command is inputted from integrated controller 10, a second clutch control is performed to output a command for controlling engagement and disengagement of second clutch CL2, to second clutch hydraulic unit 8 in AT hydraulic pressure control valve unit CVU. The shift map is a map where upshift lines and downshift lines are drawn with respect to accelerator opening APO and vehicle speed VSP as shown as an example in FIG. 8.

Brake controller 9 receives input of sensor information from a wheel speed sensor 19 for measuring the wheel speed of each of the four wheels, and a brake stroke sensor 20, and input of a cooperative regeneration control command from integrated controller 10, and input of other necessary information. For example, when a brake pedal is depressed for braking and a requested braking force calculated from a brake stroke BS is not satisfied only by a regenerative braking force, brake controller 9 performs a cooperative regenerative braking control for covering the shortage with a mechanical braking force (hydraulic braking force or motor braking force).

Integrated controller 10 manages consumed energy of the whole vehicle, and functions to allow the vehicle to travel at an optimized efficiency. Integrated controller 10 receives input of necessary information from a motor rotational speed sensor 21 for measuring motor rotational speed Nm, and other sensors, switches, etc. 22, and input of information through CAN communication line 11. Integrated controller 10 outputs a target engine torque command to engine controller 1, a target MG torque command and a target MG rotational speed command to motor controller 2, a target CL1 torque command to first clutch controller 5, a target CL2 torque command to AT controller 7, and a cooperative regeneration control command to brake controller 9.

Figure 2:
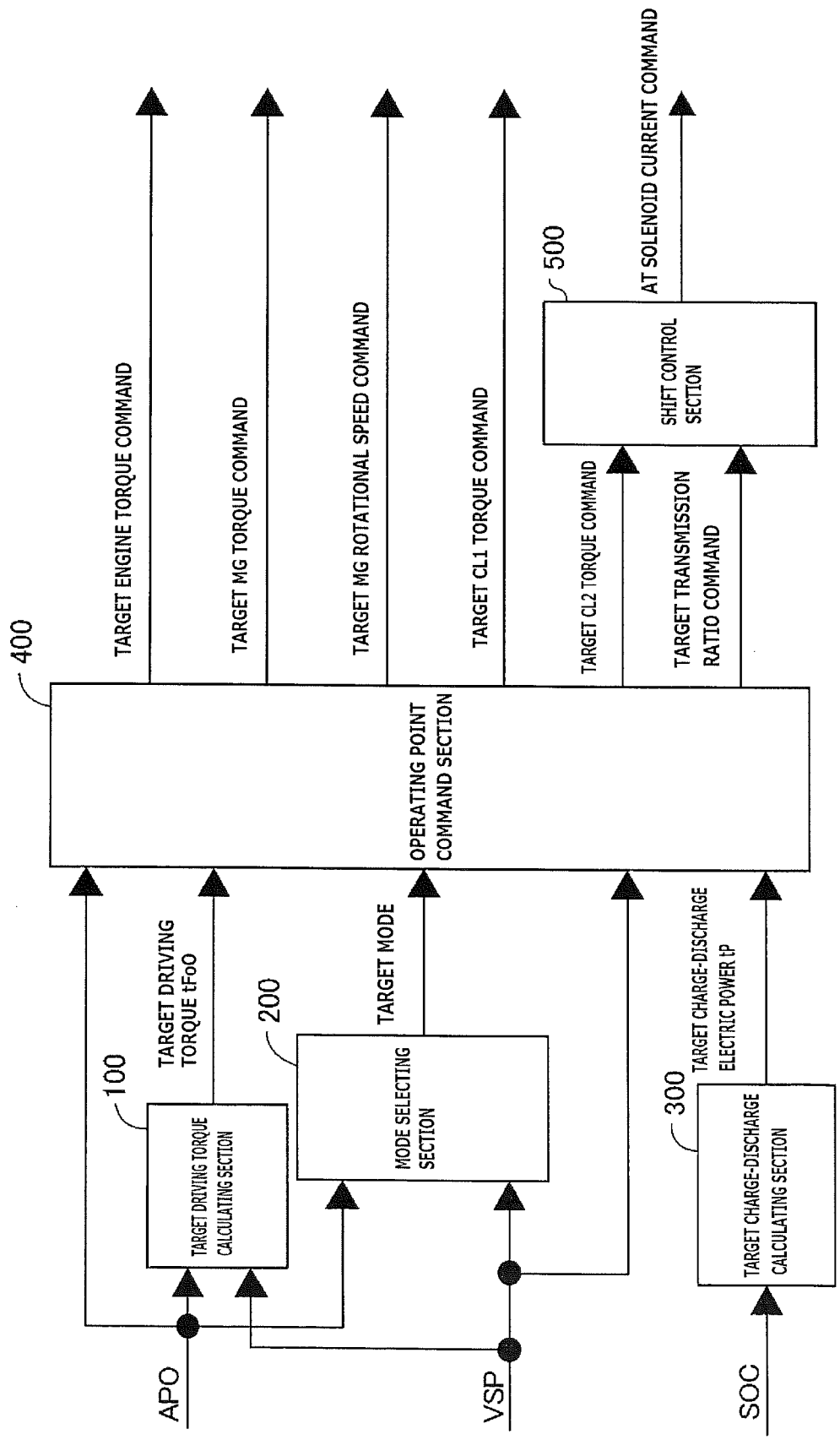
FIG. 2 is a control block diagram showing a calculation operation performed by an integrated controller of the hybrid vehicle control apparatus according to or more embodiments of the present invention.
Figure 3:
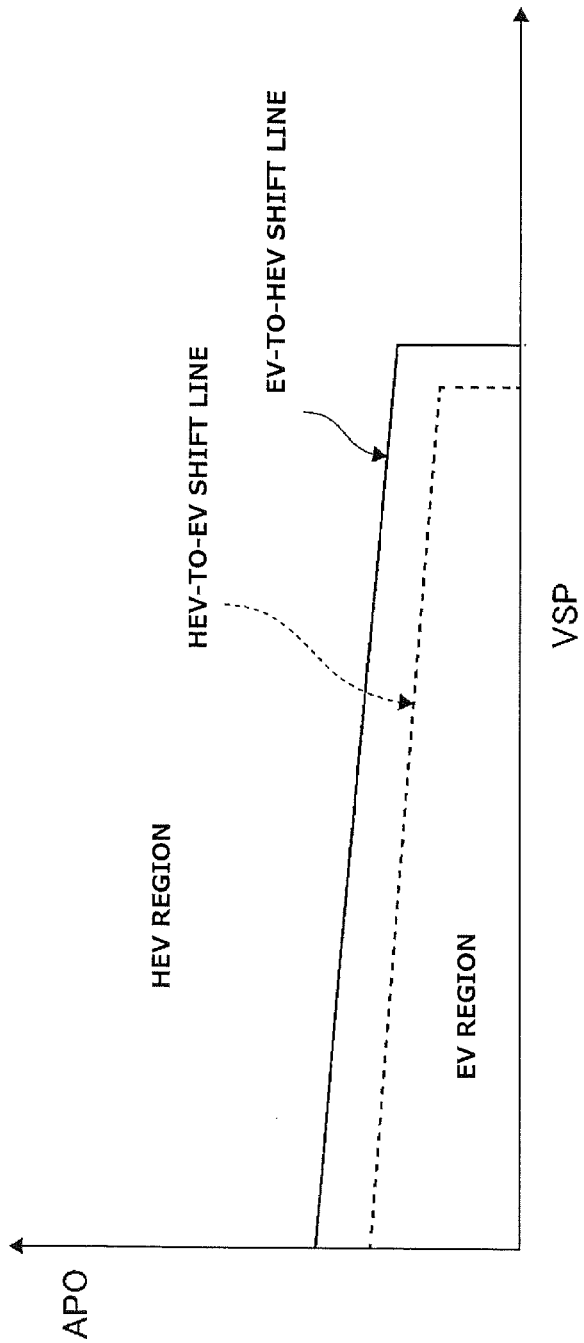
FIG. 3 is a diagram showing an EV-HEV selection map used when a mode selection operation is performed by the integrated controller of the hybrid vehicle control apparatus according to one or more embodiments of the present invention.

FIG. 2 is a control block diagram showing a calculation operation performed by integrated controller 10 of the hybrid vehicle to which the hybrid vehicle control apparatus according to one or more embodiments of the present invention is applied. FIG. 3 is a diagram showing an EV-HEV selection map used when a mode selection operation is performed by integrated controller 10 of the hybrid vehicle. The following describes the calculation operation performed by integrated controller 10 according to one or more embodiments of the present invention with reference to FIGS. 2 and 3.

Figure 4A:
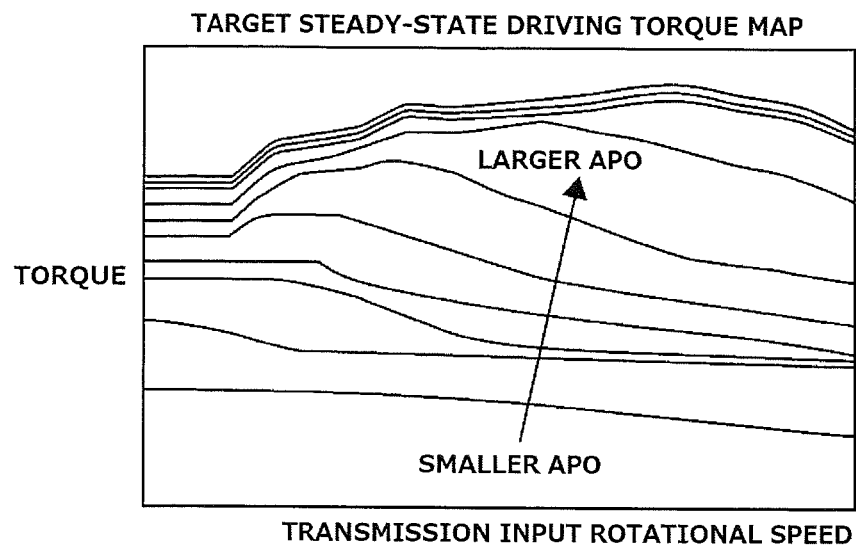
FIG. 4A is a map diagram showing a steady-state target driving torque map used by the integrated controller of the hybrid vehicle control apparatus according to one or more embodiments of the present invention.
Figure 4B:
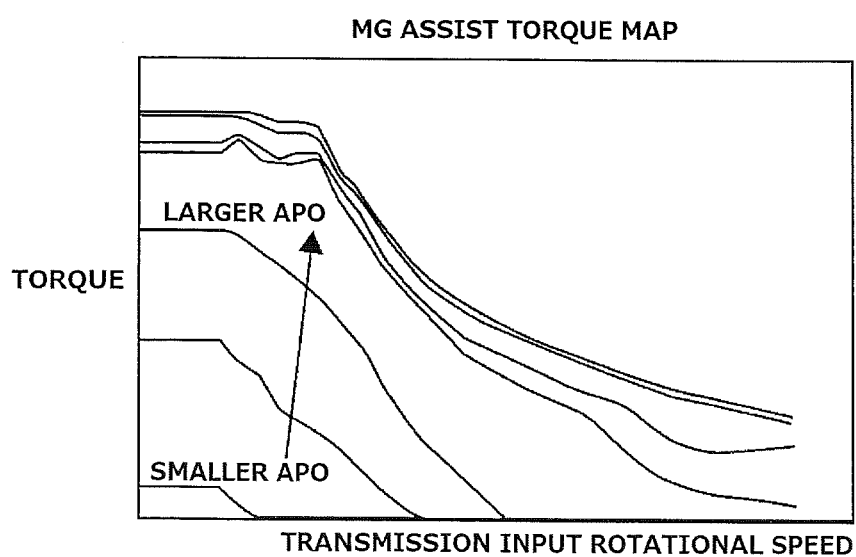
FIG. 4B is a map diagram showing an MG assist torque map used by the integrated controller of the hybrid vehicle control apparatus according to one or more embodiments of the present invention.

As shown in FIG. 2, integrated controller 10 includes a target driving torque calculating section 100, a mode selecting section 200, a target charge-discharge calculating section 300, and an operating point command section 400. Target driving torque calculating section 100 calculates a target steady-state driving torque and an MG assist torque based on accelerator opening APO and the transmission input rotational speed corresponding to vehicle speed VSP, by using a target steady-state driving torque map shown in FIG. 4A and an MG assist torque map shown in FIG. 4B.

Figure 5:
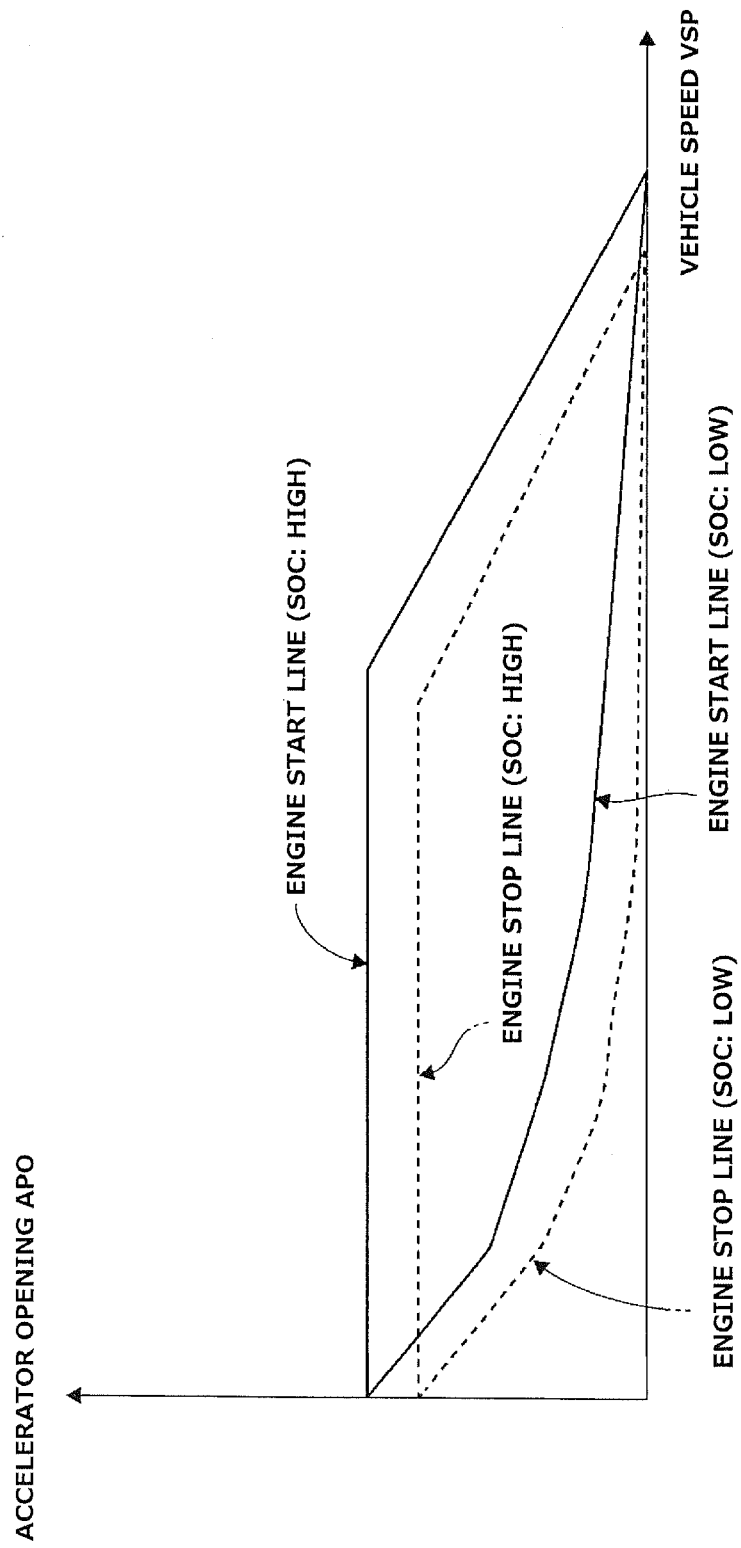
FIG. 5 is a map diagram showing engine start/stop lines used by the hybrid vehicle control apparatus according to one or more embodiments of the present invention.

Mode selecting section 200 selects one of "EV drive mode" and "HEV drive mode" as a target drive mode by using an engine start/stop line map shown in FIG. 5 which is set by accelerator opening APO with respect to vehicle speed. The engine start line and the engine stop line become lower in the direction of decrease of accelerator opening as the battery SOC decreases.

Figure 6:
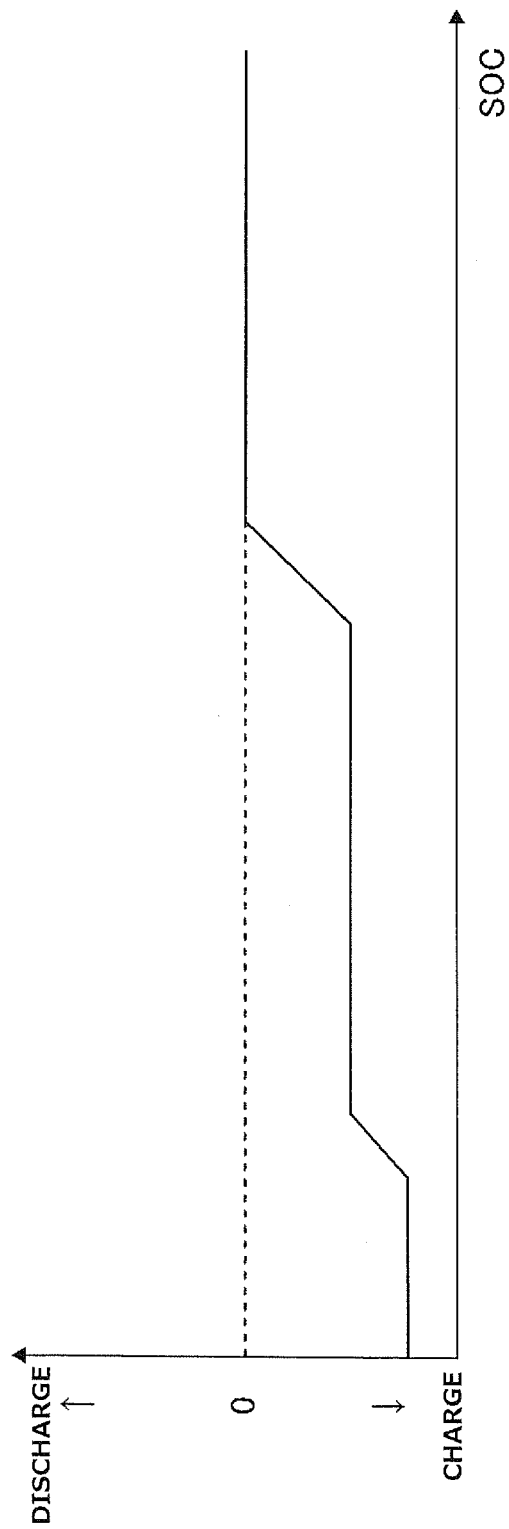
FIG. 6 is a characteristic diagram showing a running-condition requested generation output with respect to a battery SOC, used by the hybrid vehicle control apparatus according to one or more embodiments of the present invention.
Figure 7:
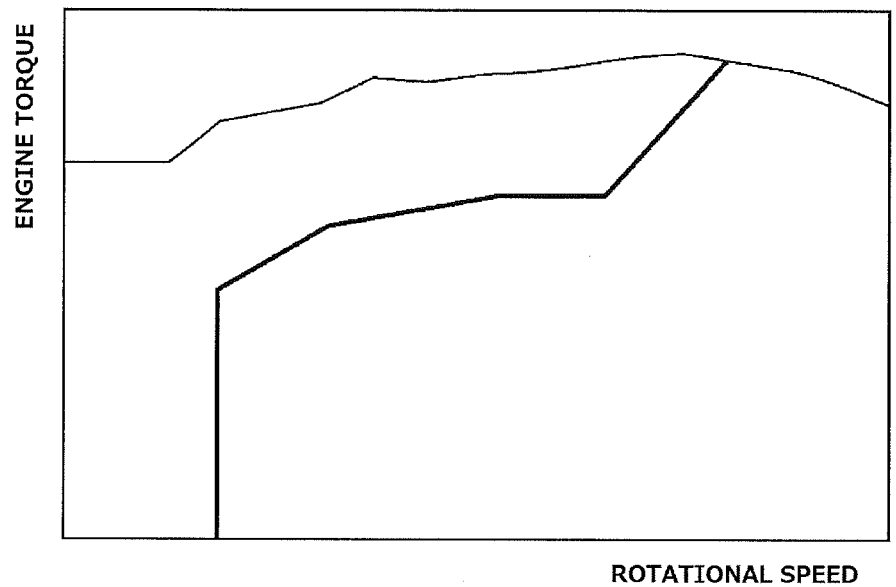
FIG. 7 is a characteristic diagram showing an optimal engine fuel efficiency line used by the hybrid vehicle control apparatus according to one or more embodiments of the present invention.

Target charge-discharge calculating section 300 calculates a target generation output based on the battery SOC by using a running-condition requested generation output map shown in FIG. 6. Moreover, target charge-discharge calculating section 300 calculates an output required to increase the engine torque from a current operating point up to an optimal fuel efficiency line indicated by a bold line in FIG. 7, and compares the required output with the target generation output, and adds the smaller of the required output and the target generation output as a requested output to the engine output.

Operating point command section 400 calculates a transient target engine torque, a transient target MG torque, a transient target MG rotational speed, a transient target CL1 torque, a transient target CL2 torque, and a transient target transmission ratio, as a target of operating point, based on accelerator opening APO, target driving torque tFoO, MG assist torque, target mode, vehicle speed VSP, and target charge-discharge electric power (requested generation output) tP. The calculation result is outputted to controllers 1, 2, 5 and 7 via CAN communication line 11.

Moreover, operating point command section 400 performs an engine start operation. Mode selecting section 200 performs mode shifting from the EV drive mode to the HEV drive mode with engine starting, when the operating point defined by the combination of accelerator opening APO and vehicle speed VSP enters an HEV region across the EV to HEV shift line during EV driving. Furthermore, mode selecting section 200 performs driving mode shifting from the HEV drive mode to the EV drive mode with engine stopping and separation, when the operating point enters an EV region across the HEV to EV shift line during HEV driving.

In response to the driving mode shifting, operating point command section 400 performs the start operation at a time instant when accelerator opening APO exceeds the engine start line shown in FIG. 5 during the EV drive mode. The start operation is implemented by controlling the torque capacity of second clutch CL2 to allow the second clutch CL2 to slip in half-engaged state, and judges that second clutch CL2 starts to slip, and thereafter increase the engine rotational speed by starting engagement of first clutch CL1. Then, as the engine rotational speed reaches a rotational speed allowing initial explosion, operating point command section 400 activates engine Eng, and completely engages first clutch CL1 in response to a condition that the motor rotational speed becomes close to the engine rotational speed, and thereafter locks up second clutch CL2, thereby shifting into the HEV drive mode.

Figure 8:
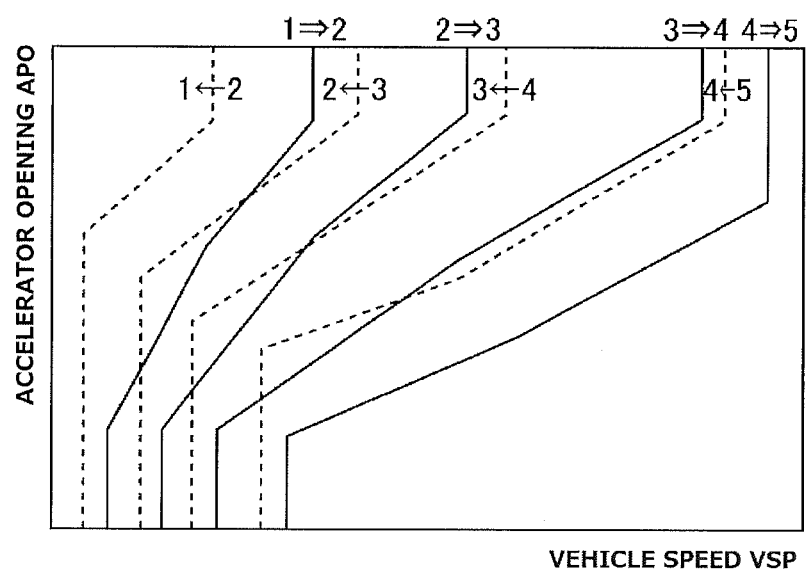
FIG. 8 is a shift map diagram showing an example of shift lines in an automatic transmission used by the hybrid vehicle control apparatus according to one or more embodiments of the present invention.

A shift control section 500 controls solenoid valves in automatic transmission AT to be driven for achieving the target CL2 torque capacity and the target transmission ratio. FIG. 8 shows shift lines. Shift control section 500 determines a target gear position from the current gear position, based on vehicle speed VSP and accelerator opening APO, and controls shift clutches for a gearshift if a gearshift request is present.

Figure 9:
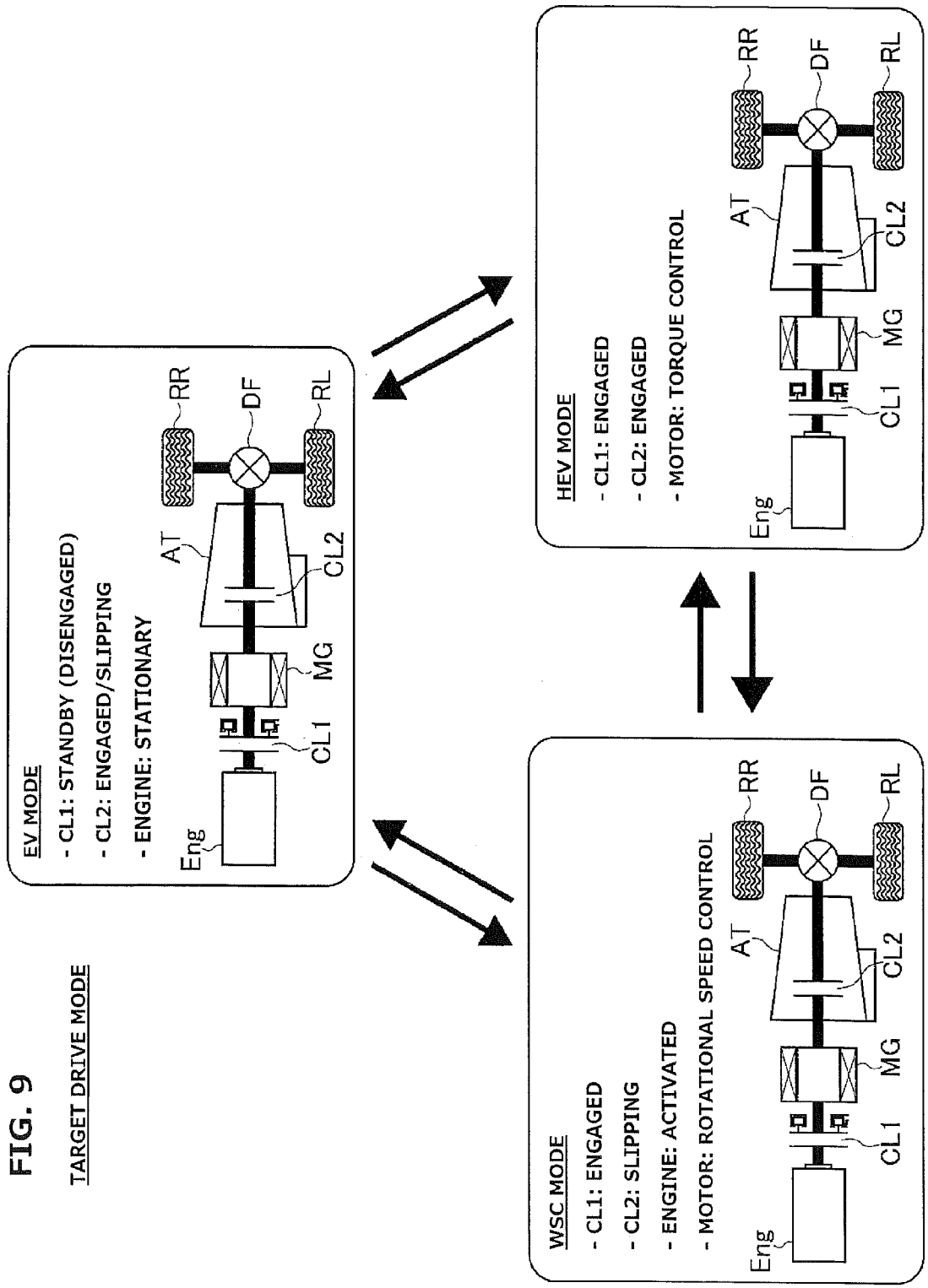
FIG. 9 is a target drive mode diagram showing an example of target drive mode transition in the hybrid vehicle control apparatus according to one or more embodiments of the present invention.

Integrated controller 10 including the configuration described above sets a WSC mode as a drive mode in addition to the EV mode and the HEV mode as shown in FIG. 9, wherein the WSC mode is set in a transient period of drive mode shifting therebetween. The EV mode is a mode where the vehicle is driven only by power of motor generator MG. In the EV mode, engine Eng is maintained at rest, and first clutch CL1 is disengaged, and second clutch CL2 is engaged or slip-engaged to transmit only output rotation from motor generator MG to left and right rear wheels RL, RR through automatic transmission AT. The HEV mode is a mode where the vehicle is driven by power of engine Eng and motor generator MG. In the HEV mode, second clutch CL2 and first clutch CL1 are engaged to transmit output rotation from engine Eng and output rotation from motor generator MG to left and right rear wheels RL, RR through automatic transmission AT. The WSC mode is a mode where the vehicle is started with clutch torque capacity control, at N to D selecting start from the HEV mode, or at D range start from the EV mode or the HEV mode. In this mode, the vehicle is started, while second clutch CL2 is maintained in slip-engaged state by rotational speed control of motor generator MG, and the clutch transmitted torque through second clutch CL2 is controlled to conform to a requested driving torque that is determined by vehicle condition and driver's operation. In this situation, since second clutch CL2 is in slip-engaged state, it is possible to absorb a mode shifting shock, and thereby serve for shock suppression. "WSC" is an abbreviation for "Wet Start Clutch".

Figure 10:
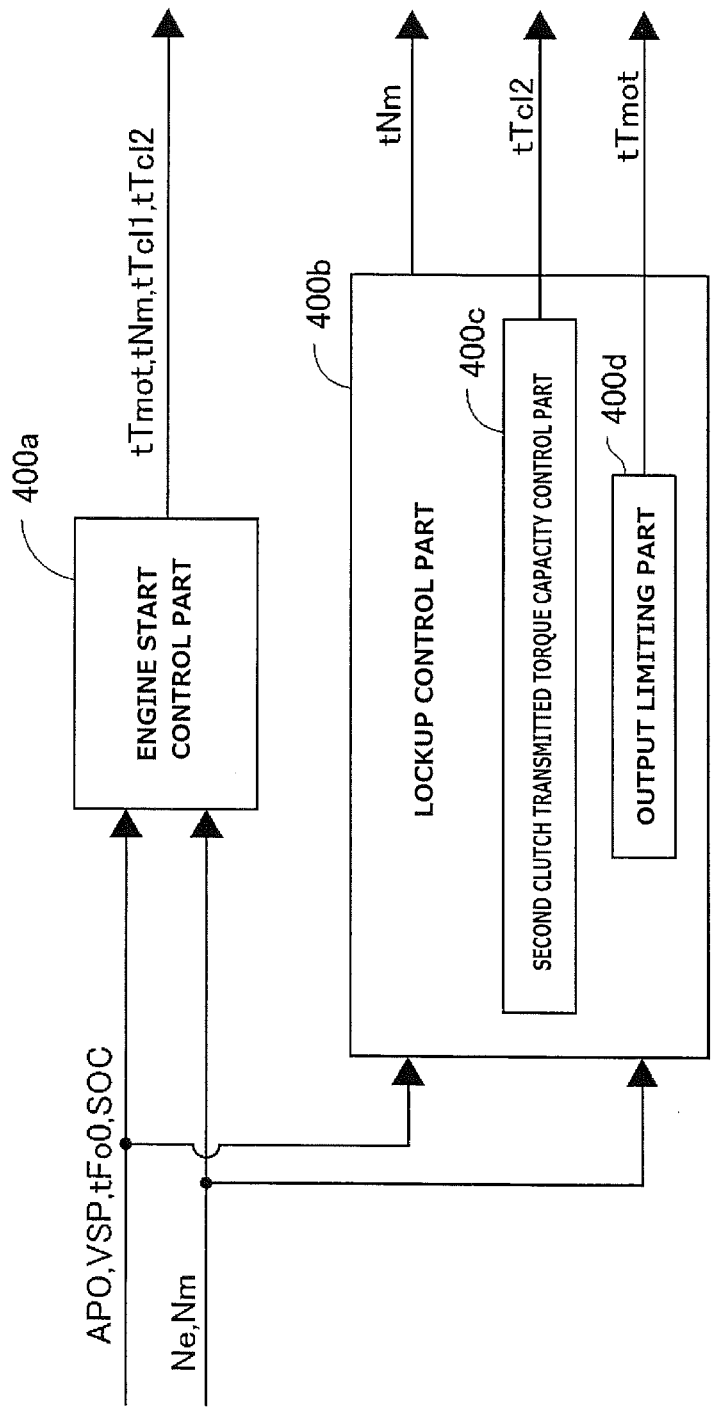
FIG. 10 is a block diagram showing a major part of the integrated controller of the hybrid vehicle control apparatus according to one or more embodiments of the present invention.

[Operation Configuration of Engine Start Control Section] During shifting from the EV mode to the HEV mode, an engine start control part 400a of operating point command section 400 of integrated controller 10 shown in FIG. 10 performs engine start judgement, and if an engine start request is present, performs an engine start control. As described above, the engine start judgement is started at a time instant when accelerator opening APO and vehicle speed VSP cross the engine start line shown in FIG. 5.

Figure 11:
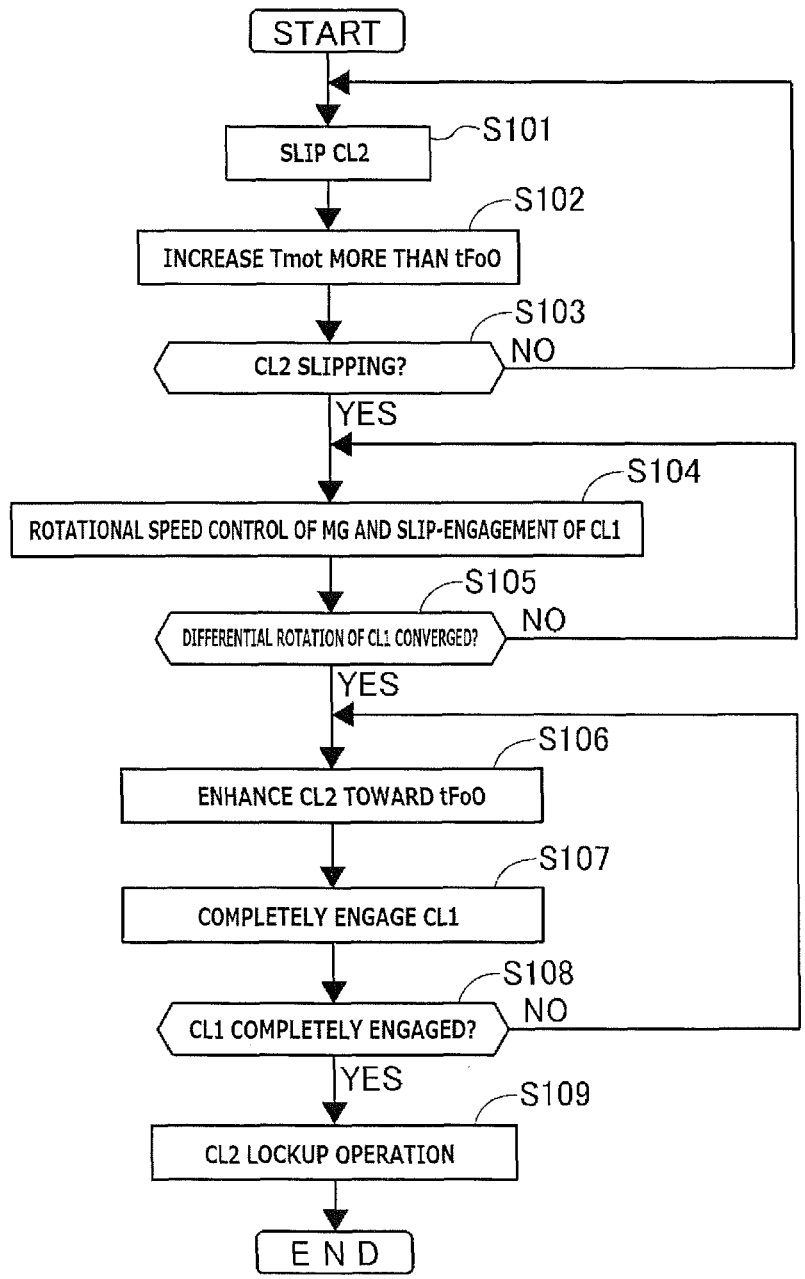
FIG. 11 is a flow chart showing a flow of engine start control operation in the hybrid vehicle control apparatus according to one or more embodiments of the present invention.

The following briefly describes a flow of engine start control operation performed by engine start control part 400a with reference to the flow chart of FIG. 11. At Step S101, engine start control part 400a allows second clutch CL2 to slip, and then proceeds to the next Step S102. The slip of second clutch CL2 is produced by reducing a second clutch transmitted torque capacity command value tTcl2 to a slip-control-condition value Tslip (see FIG. 14), and thereafter increasing the second clutch transmitted torque capacity command value tTcl2 gradually toward a cranking-condition CL2 torque limit value Tcrlim with which second clutch CL2 can be maintained in slip state. Next, at Step S102, engine start control part 400a increases motor torque Tmot more than target driving torque tFoO (target steady-state torque), wherein motor torque Tmot is the output torque of motor generator MG, and then proceeds to Step S103.

At Step S103, engine start control part 400a judges whether second clutch CL2 is slipping, and when second clutch CL2 is not slipping, returns to Step S101, and when second clutch CL2 is slipping, proceeds to Step S104. This judgement about slipping state is based on the difference between motor rotational speed Nm and the product of the output rotational speed of automatic transmission AT and the gear ratio Nout.

At Step S104 to which engine start control part 400a proceeds when second clutch CL2 is slipping, engine start control part 400a performs rotational speed control of motor generator MG, and slip-engages first clutch CL1, and then proceeds to Step S105. When first clutch CL1 is slip-engaged, a first clutch transmitted torque capacity command value tTcl1 is increased to a predetermined cranking-condition torque Tcr (see FIG. 14) for transmitting a starting torque from motor generator MG to engine Eng. Cranking-condition torque Tcr is set to a value within a range expressed by the following equation, for maintaining second clutch CL2 stably in slip state.

$$Tcl1min<Tcr<Tmmax-tTcl2=Tmmax-tTi$$

Tcl1min is an engine friction value before engine ignition, and is set to zero after engine ignition. Tmmax is a maximum torque of motor generator MG. tTcl2 is a transmitted torque capacity command value of second clutch CL2. tTi is a target transmission input torque, and is set to target driving torque tFoO. The motor rotational speed control is performed to control the motor rotational speed Nm, to increase engine rotational speed Ne to a predetermined start-condition rotational speed Nest.

Next, at Step S105, engine start control part 400a judges whether or not the differential rotation of first clutch CL1 is in a differential rotation convergence state within a predetermined difference level, and when it is affirmative, proceeds to Step S106, and when it is negative, returns to Step S104.

At Step S106 to which engine start control part 400a proceeds when first clutch CL1 in the differential rotation convergence state, engine start control part 400a increases the second clutch transmitted torque capacity (second clutch transmitted torque capacity command value tTcl2 in one or more embodiments of the present invention) toward target driving torque tFoO, and then proceeds to Step S107. At Step S107, engine start control part 400a enhances first clutch CL1 toward complete engagement, and then proceeds to Step S108.

At Step S108, engine start control part 400a judges whether or not first clutch CL1 is completely engaged, and when it is affirmative, proceeds to Step S109, and when it is negative, returns to Step S106. At Step S109 to which engine start control part 400a proceeds when first clutch CL1 is completely engaged, engine start control part 400a performs a lockup operation to control second clutch CL2 to complete engagement, and then proceeds to the end and terminates the engine start control.

Figure 12:
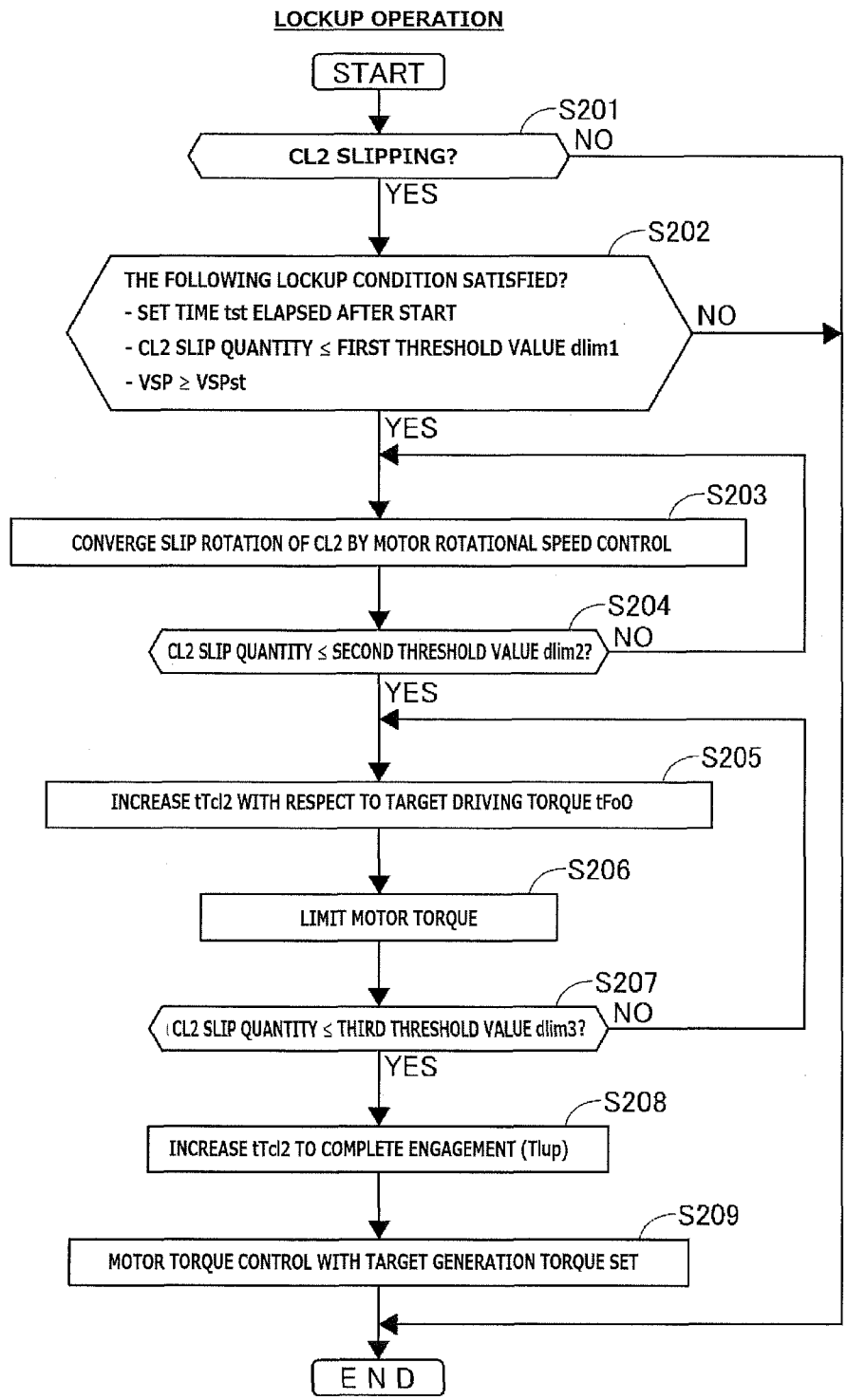
FIG. 12 is a flow chart showing a flow of lockup operation in the hybrid vehicle control apparatus according to one or more embodiments of the present invention.

The lockup operation is carried out by a lockup control part 400b shown in FIG. 10. The following describes a flow of the lockup operation with reference to the flow chart of FIG. 12. First, at Step S201, lockup control part 400b determines whether or not second clutch CL2 is in slip state, and when it is affirmative, proceeds to Step S202, and when it is negative, proceeds to the end and terminates the second clutch lockup operation.

Next, at Step S202, lockup control part 400b determines whether or not a lockup condition is satisfied, and when it is affirmative, proceeds to Step S203, and when it is negative, proceeds to the end and terminates the second clutch lockup operation. The lockup condition is that all of the following three conditions are satisfied. The first condition is that elapsed time after engine start judgement exceeds a predetermined set time "tst". The set time tst is set to a time period required for the second clutch transmitted torque capacity to actually become equivalent to target driving torque tFoO and shit into engaged state after the command output (S106) for target driving torque tFoO. Specifically, set time tst is set to a several tenths of a second. The second condition is that the slip quantity (difference between input rotation and output rotation) of second clutch CL2 is smaller than or equal to a predetermined first threshold value dlim1. The first threshold value dlim1 is a value for judging whether second clutch CL2 can be locked up, and specifically, for judging whether actual motor rotational speed rNm has not exceeded motor rotational speed command value tNm. The third condition is that vehicle speed VSP is greater than or equal to a predetermined set vehicle speed. For example, the set vehicle speed is set higher than the engine stop line shown in FIG. 5.

At Step S203 to which lockup control part 400b proceeds when the lockup condition is satisfied at Step S202, lockup control part 400b performs a slip convergence operation to converge the slip rotation of second clutch CL2 by using the rotational speed control of motor generator MG, and then proceeds to Step S204.

At Step S204, lockup control part 400b determines whether or not the slip quantity of second clutch CL2 is caused to be smaller than or equal to a predetermined second threshold value dlim2 by the motor rotational speed control at Step S203. When it is affirmative, lockup control part 400b proceeds to Step S205. When it is negative, lockup control part 400b returns to Step S203. The second threshold value dlim2 is a value for judging whether or not the slip differential rotation is converged so as to prevent a shock even if second clutch CL2 is lockup-engaged. Since engagement of second clutch CL2 can cause a shock due to inertial force of motor generator MG, the second threshold value dlim2 is set to a value with which the shock can be suppressed below a predetermined level, based on experiments or simulations.

At Step S205 to which lockup control part 400b proceeds when the slip differential rotation becomes smaller than or equal to second threshold value dlim2, lockup control part 400b performs a lockup-condition second clutch control to slowly increase second clutch transmitted torque capacity command value tTcl2 with respect to target driving torque tFoO, and then proceeds to Step S206.

Figure 13:
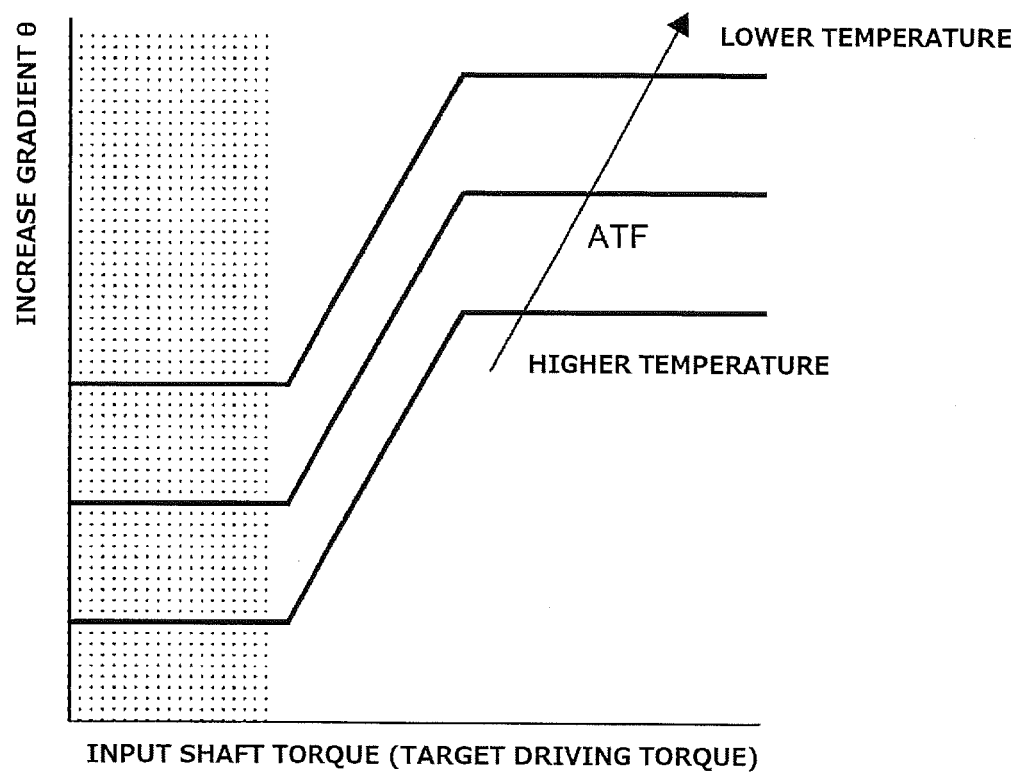
FIG. 13 is an increase gradient characteristic diagram showing a set characteristic of increase gradient in a lockup control part of the hybrid vehicle control apparatus according to one or more embodiments of the present invention.

The lockup-condition second clutch control at Step S205 is carried out by a second clutch transmitted torque capacity control part 400c shown in FIG. 10. Second clutch transmitted torque capacity control part 400c controls second clutch transmitted torque capacity command value tTcl2 to be higher by a set quantity than target driving torque tFoO that is the input torque of second clutch CL2. The value higher by the set quantity is a value set for bringing the second clutch CL2 gradually to complete engagement, and specifically, is gradually increased by an increase gradient θ (see FIG. 14) with respect to target driving torque tFoO in one or more embodiments of the present invention. The increase gradient θ is set based on the target input shaft torque as shown in FIG. 13, and is set higher with decrease of an ATF temperature that is temperature of engagement pressure oil of second clutch CL2, because the responsiveness becomes worse as the temperature decreases.

Referring back to FIG. 12, at Step S206, lockup control part 400b performs an operation to limit motor torque Tmot to a motor torque limit value Tmlim, and then proceeds to Step S207. The motor torque limit value Tmlim is carried out by an output limiting part 400d shown in FIG. 10. First, output limiting part 400d causes the motor torque Tmot to decrease from the current motor torque toward zero-torque at a predetermined gradient. In one or more embodiments of the present invention, the gradient is set so that the motor torque Tmot becomes zero-torque after a set time period (about several hundred milliseconds) from the current motor torque Tmot. The gradient may be a predetermined fixed value.

Referring back to FIG. 12, at Step S207 following the Step S206, lockup control part 400b determines whether or not the slip quantity of second clutch CL2 becomes smaller than or equal to a third threshold value dlim3. When it is affirmative, lockup control part 400b proceeds to Step S208. When it is negative, lockup control part 400b returns to Step S205. The third threshold value dlim3 is a value for determining that no slip differential rotation occurs, and therefore is set equal to or extremely close to zero.

At Step S208 to which lockup control part 400b proceeds when the slip quantity of second clutch CL2 becomes smaller than or equal to the third threshold value dlim3, lockup control part 400b increases the second clutch transmitted torque capacity command value tTcl2 to a value for completely engaging the second clutch CL2 (lockup torque Tlup (see FIG. 14)), and then proceeds to Step S209. At Step S209, lockup control part 400b performs torque control of motor generator MG to a target generation torque, and then proceeds to the end and terminates the lockup operation.

Figure 14:
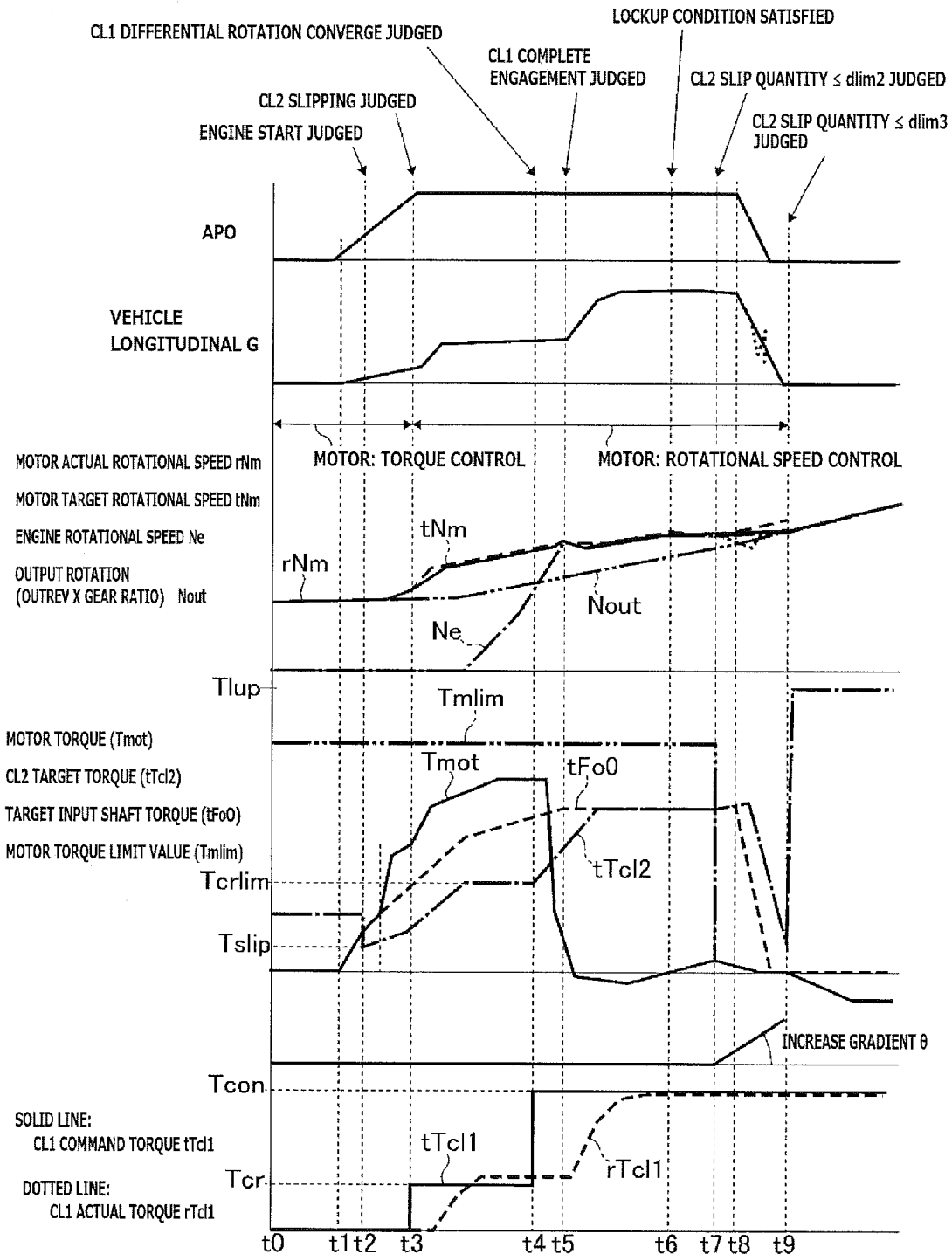
FIG. 14 is a time chart showing an example of operation in one or more embodiments of the present invention and in a comparative example.

(Operation) The following describes operation of one or more embodiments of the present invention with reference to an example of operation shown in the time chart of FIG. 14. The example of operation is in a situation where the vehicle is coasting with the accelerator opening equal to zero in the EV mode, and then a driver performs an acceleration operation by depressing the accelerator pedal so that the vehicle shifts into the HEV mode.

In FIG. 14, at a time instant t0, the vehicle is coasting with the accelerator opening equal to zero in the EV mode as described above. In this situation, depression of the accelerator pedal is started at a time instant t1 so that accelerator opening APO starts to increase, and is thereafter maintained constant at a value at about a time instant t3.

In the situation where such accelerator pedal operation (acceleration operation) is performed, engine start judgement is done at time instant t2. This is done at the event that accelerator opening APO and vehicle speed VSP cross the engine start line (see FIG. 5). When the engine start judgement is done, the engine start control shown in FIG. 10 is performed so that first, motor torque Tmot that is the driving torque of motor generator MG is increased with second clutch CL2 slipped (Step S101 to Step S102).

Then, at time instant t3 when it is determined that second clutch CL2 is slipping, rotational speed control is performed for motor generator MG, and first clutch CL1 is slip-engaged, and thereby the motor rotation is inputted to engine Eng, to stat cranking (Step S103 to Step S104).

Thereafter, at time instant t4 when the differential rotation between engine rotational speed Ne and motor rotational speed Nm becomes lower than or equal to a predetermined value so that it is judged that the differential rotation of first clutch CL1 is converged, the second clutch transmitted torque capacity command value tTcl2 is increased toward target driving torque tFoO. Furthermore, the first clutch transmitted torque capacity command value tTcl1 is increased to an engaged-condition value Tcon to bring first clutch CL1 toward complete engagement.

Thereby, at time instant t5, it is determined that first clutch CL1 is completely engaged, and complete explosion of engine Eng is achieved, and engine rotational speed Ne is substantially equal to motor rotational speed Nm. Then, at time instant t6 when the lockup condition is satisfied, the second clutch lockup operation is started (Step S108 to Step S109), and the second clutch CL2 is controlled toward complete engagement.

(Second Clutch Lockup Operation) The following describes the second clutch lockup operation. First, the following describes a comparative example, before description of the second clutch lockup operation.

COMPARATIVE EXAMPLE

In the comparative example, as in the conventional art, during the second clutch lockup operation, the second clutch transmitted torque capacity command value tTcl2 is increased toward lockup torque Tlup at a constant gradient.

Such second clutch lockup operation is not confronted by the above, when the driver continues to depress the accelerator pedal (not shown). However, if the driver loosens depression of the accelerator pedal while the second clutch lockup operation is being performed, the following may occur.

In the operation example shown in FIG. 14, at time instant t8, the driver loosens depression of the accelerator pedal (not shown) so that target driving torque tFoO decreases as indicated by a dotted line in FIG. 14. In this situation, the transmitted torque at second clutch CL2 decreases rapidly, so that second clutch CL2 is completely engaged rapidly. This causes a fluctuation in engine rotational speed Ne in a short time, and also a fluctuation in vehicle longitudinal acceleration G in a short time, as indicated by dotted lines, to cause a shock. By such foot release from the accelerator pedal (not shown), the target driving torque fluctuates in a region indicated by hatched pattern in FIG. 13, for example.

(Second Clutch Lockup Operation) In contrast, in the second clutch lockup operation of one or more embodiments of the present invention, the lockup condition (Step S202) is first satisfied at time instant t6, and the slip convergence operation is performed to converge slip rotation of second clutch CL2 by rotational speed control of motor generator MG. The lockup condition is that the elapsed time from the engine start judgement (t4) exceeds the predetermined set time tst, and the slip of second clutch CL2 is smaller than or equal to the predetermined first threshold value dlim1, and vehicle speed VSP is higher than or equal to the predetermined set vehicle speed.

Then, by the slip convergence operation, the slip of second clutch CL2 becomes smaller than or equal to the second threshold value dlim2 at time instant t7, so that the lockup-condition second clutch control is performed by second clutch transmitted torque capacity control part 400c and the motor output limitation is performed by output limiting part 400d. Thereby, the second clutch transmitted torque capacity command value tTcl2 increases gradually with respect to target driving torque tFoO, and motor torque Tmot is limited to motor torque limit value Tmlim (Step S204, Step S205, and Step S206). Specifically, motor torque limit value Tmlim is first set to the current motor torque Tmot, and then reduced to zero torque in the set time period.

Accordingly, when the driver loosens depression of the accelerator pedal (not shown) so that target driving torque tFoO falls at time instant t8, the second clutch transmitted torque capacity command value tTcl2 gradually increases with respect to target driving torque tFoO. As a result, as target driving torque tFoO decreases, second clutch transmitted torque capacity command value tTcl2 decreases more slowly. Additionally, motor torque Tmot is limited to motor torque limit value Tmlim.

Therefore, as compared to the conventional art, the input torque to second clutch CL2 is limited more significantly, and the transmitted torque capacity of second clutch CL2 is suppressed more significantly, so that second clutch CL2 is suppressed from being engaged rapidly.

Additionally, at the moment, second clutch transmitted torque capacity command value tTcl2 is set to reduce the transmitted torque, while the difference from target driving torque tFoO (equal to the sum of engine torque Te and motor torque Tmot) increases gradually.

Accordingly, irrespective of the speed of loosening depression of the accelerator pedal, it is possible to reliably suppress the occurrence of a shock by making the speed of convergence of slip of second clutch CL2 constant. Incidentally, at time instant t9 when the slip quantity of second clutch CL2 exceeds the third threshold value dlim3, the second clutch transmitted torque capacity command value tTcl2 is increased up to lockup torque Tlup, and motor torque Tmot is set to the generation torque.

Since the second clutch transmitted torque capacity command value tTcl2 is set to deviate gradually from target driving torque tFoO, engagement can be strengthened gradually toward complete engagement when the accelerator pedal (not shown) is depressed. Accordingly, it is unnecessary to vary the control in conformance with variation of depressing state of the accelerator pedal (not shown), so that the control can be simplified. This serves to suppress the manufacturing cost.

Additionally, during the control toward lockup, by limiting the motor torque Tmot gradually during rotational speed control, it is possible to suppress a shock resulting from engagement of second clutch CL2 more effectively as compared to control without such limitation. Moreover, since the slip of second clutch CL2 is converged proactively by the motor rotational speed control, it is possible to further suppress second clutch CL2 from causing a shock from engagement.

<a> A hybrid vehicle control apparatus according to one or more embodiments of the present invention includes: an engine Eng and a motor generator MG as drive sources of a vehicle; a first clutch CL1 disposed between the engine Eng and the motor generator MG; a second clutch CL2 disposed between the motor generator MG and a driving wheel (left and right rear wheels RL, RR); a lockup control part 400b configured to perform a lockup operation to shift the second clutch CL2 from slip state into completely engaged state when a predetermined lockup condition is satisfied under a condition that the second clutch CL2 is in the slip state; and a second clutch transmitted torque capacity control part 400c included in the lockup control part 400b, and configured to perform a lockup-condition second clutch control (operation at Step S205) to control transmitted torque capacity of the second clutch CL2 to a value higher by a set quantity than target driving torque tFoO as an input torque to the second clutch during the shifting. According to this configuration, at the lockup of second clutch CL2, the second clutch transmitted torque capacity command value tTcl2 is not increased at a constant gradient, but is controlled to a value higher by the set quantity than target driving torque tFoO that is the input toque to second clutch CL2. Thereby, even when the input torque to second clutch CL2 rapidly decreases by driver's foot release from the accelerator pedal, it is possible to suppress second clutch CL2 from being rapidly engaged due to excess of the second clutch transmitted torque capacity. This makes it possible to suppress the occurrence of a shock resulting from rapid change of engine rotational speed Ne and rapid change of vehicle longitudinal acceleration G resulting from rapid engagement of second clutch CL2. Additionally, since the lockup-condition second clutch transmitted torque capacity is set with respect to target driving torque tFoO that is the input torque of second clutch CL2, it is unnecessary to vary the control in conformance with variation of depressing state of the accelerator pedal (not shown), so that the control can be simplified. This serves to suppress the manufacturing cost.

<b> The hybrid vehicle control apparatus according to one or more embodiments of the present invention is configured such that the second clutch transmitted torque capacity control part 400c is configured to control the second clutch transmitted torque capacity command value tTcl2 as the transmitted torque capacity of the second clutch such that deviation of the second clutch transmitted torque capacity command value tTcl2 from the target driving torque tFoO increases gradually at the increase gradient θ with time, while performing the lockup-condition second clutch control (operation at Step S205). According to this configuration, when the lockup-condition second clutch control is being performed, the second clutch transmitted torque capacity command value tTcl2 is controlled to deviate gradually from target driving torque tFoO. This makes it possible to gradually strengthen engagement of second clutch CL2 from slip state, and when the driver loosens depression of the accelerator pedal, make the converging speed of slip of second clutch CL2 constant, irrespective of the speed of loosening. This further enhances the effect of suppressing shock occurrence of <a>. In addition, in one or more embodiments of the present invention, the increase gradient θ is set depending on the ATF temperature, specifically, set to increase as the ATF temperature decreases so that the deviation of the second clutch transmitted torque capacity command value tTcl2 from target driving torque tFoO increases as the ATF temperature decreases. This serves to suppress the responsiveness of second clutch CL2 from being affected by decrease of the ATF temperature, and thereby achieve suitable control timing.

<c> The hybrid vehicle control apparatus according to one or more embodiments of the present invention is configured such that the second clutch transmitted torque capacity control part 400c is configured to use target driving torque tFoO as the input torque of the second clutch CL2. According to this configuration, since the available target driving torque tFoO is used as the input torque of second clutch CL2, the control can be simplified for cost reduction, as compared to cases where the input torque is calculated additionally.

<d> The hybrid vehicle control apparatus according to one or more embodiments of the present invention is configured such that the lockup control part 400b is configured to perform a slip convergence operation (operation at Step S203) to converge a slip quantity of the second clutch CL2 to or below a set quantity by a rotational speed control of the motor generator MG, before the second clutch transmitted torque capacity control part 400c performs the lockup-condition second clutch control. According to this configuration, since the differential rotation between input rotation and output rotation (slip quantity) of the second clutch CL2 is made small proactively by the rotational speed control of motor generator MG, it is possible to suppress the shock resulting from lockup of second clutch CL2.

<e> The hybrid vehicle control apparatus according to one or more embodiments of the present invention is configured such that the lockup control part 400b includes an output limiting part 400d configured to limit an output torque of the motor generator MG (operation at Step S206) along with the control of the transmitted torque capacity of the second clutch CL2 by the second clutch transmitted torque capacity control part 400c, during the lockup operation. This makes it possible to suppress fluctuation of input torque at the lockup of second clutch CL2, and thereby suppress shock occurrence resulting from the lockup engagement. Additionally, in one or more embodiments of the present invention, the motor toque limit value Tmlim for limiting the motor torque Tmot is set to zero-torque within the set time period after the slip convergence determination for second clutch CL2 (at time instant t7). This makes it possible to further suppress shock occurrence, as compared to cases where the motor toque limit value Tmlim is set to a value greater than zero-torque. Moreover, in one or more embodiments of the present invention, it is possible to further suppress shock occurrence, also as compared to cases where the motor toque limit value Tmlim is reduced instantaneously below the motor torque Tmot that is outputted actually.

<f> The hybrid vehicle control apparatus according to one or more embodiments of the present invention is configured such that the lockup control part 400b is configured to: perform the slip convergence operation in response to a condition that the slip quantity of the second clutch CL2 becomes smaller than or equal to a predetermined first threshold value dlim1 (Steps S202 to S203); and thereafter perform the lockup-condition second clutch control and the output limiting by the output limiting part 400d in response to a condition that the slip quantity becomes smaller than or equal to a second threshold value dlim2 smaller than the first threshold value dlim1. Namely, depending on the slip state of second clutch CL2, the slip quantity is first reduced by the motor rotational speed control. Thereafter, when the slip quantity becomes a set level, the lockup is targeted by control of the transmitted torque capacity of second clutch CL2 and the output limiting of motor generator MG. This serves to further suppress shock occurrence.

<g> The hybrid vehicle control apparatus according to one or more embodiments of the present invention further includes an engine start control part 400a configured to perform an engine start operation (control in the flow chart of FIG. 11), wherein: the engine start operation includes: starting the engine Eng from an EV mode, wherein the EV mode allows driving by a driving torque of the motor generator MG with the first clutch CL1 disengaged and the second clutch CL2 engaged, by bringing the first clutch CL1 into slip-engaged state, and allowing the second clutch CL2 to slip, and increasing the driving torque of the motor generator MG; and thereafter controlling the first clutch CL1 and the second clutch CL2 into completely engaged state; and the lockup control part 400b is configured to perform the lockup operation (operation at Step S109), when the engine start control part 400a controls the second clutch CL2 into completely engaged state after the starting of the engine. This makes it possible to suppress a shock resulting from lockup of second clutch CL2 after engine start.

Although the hybrid vehicle control apparatus is described with reference to specific embodiments, specific configuration is not limited to the above embodiments, and modification, addition, etc. of design may be allowed unless it goes beyond the subject matter of the claimed invention.

For example, although the rear wheel drive vehicle is employed as the hybrid vehicle in one or more embodiments, one or more embodiments of the invention may be applied to front wheel drive vehicles and all-wheel drive vehicles. Although the lockup operation is performed at engine start in one or more embodiments, the invention is not so limited. Specifically, one or more embodiments of the present invention is applicable to cases where the second clutch is shifted from slip state to completely engaged state except for engine start condition. For example, one or more embodiments of the invention may be applied to a case where during EV running, the second clutch is controlled to slightly slip, and during this control the second clutch is shifted into completely engaged state.

Furthermore, although the lockup condition of one or more embodiments of the present invention is that that the elapsed time from the engine start judgement exceeds set time tst, and the slip of second clutch CL2 is smaller than or equal to the predetermined first threshold value dlim1, and vehicle speed VSP is higher than or equal to the predetermined set vehicle speed, the invention is not so limited. The lockup condition may be set suitably depending on cases to which one or more embodiments of the invention is applied. Although the control of the transmitted torque capacity in the lockup-condition second clutch control is implemented by increasing same at increase gradient θ with respect to the input torque (target driving torque) in one or more embodiments of the present invention, the invention is not so limited. For example, the control to spread the difference from the input torque may be implemented by increasing same in a stepwise manner or at an increasing rate varying with time, not at the constant rate as in one or more embodiments of the present invention. Even if the difference from the input torque is controlled to be constant, it is possible to obtain an aimed effect. Although the output limiting part of one or more embodiments of the present invention is configured to limit to zero-torque a predetermined time after the time instant when the second clutch slip quantity decreases below the second threshold value, the manner of limiting is not limited to the manner shown in the above embodiments. For example, the manner of reducing the limit value is not limited to the reduction to zero torque after the set time period, but may be reduction at constant gradient or reduction in stepwise manner. Additionally, the limit value is not limited to reduction to zero torque, but the command value may be limited, for example, by multiplying the command value of motor torque Tmot with a factor.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A hybrid vehicle control apparatus comprising:
an engine and a motor as drive sources of a vehicle;
a first clutch disposed between the engine and the motor;
a second clutch disposed between the motor and a driving wheel;
a lockup controller configured to perform a lockup operation to shift the second clutch from slip state into completely engaged state when a predetermined lockup condition is satisfied under a condition that the second clutch is in the slip state; and
a second clutch transmitted torque capacity controller included in the lockup controller and configured to perform a lockup-condition second clutch control to control transmitted torque capacity of the second clutch to a value higher by a set quantity than an input torque to the second clutch while the lockup operation is being performed,
wherein the input torque corresponds to a state of depression of an accelerator pedal during the shifting of the second clutch from the slip state into the completely engaged state.

2. The hybrid vehicle control apparatus as claimed in claim 1, wherein the second clutch transmitted torque capacity controller configured to control the transmitted torque capacity of the second clutch such that deviation of the transmitted torque capacity from the input torque increases gradually with time, while performing the lockup-condition second clutch control.

3. The hybrid vehicle control apparatus as claimed in claim 1, wherein the second clutch transmitted torque capacity controller configured to use a target driving torque as the input torque of the second clutch.

4. The hybrid vehicle control apparatus as claimed in claim 1, wherein the lockup controller configured to perform a slip convergence operation to converge a slip quantity of the second clutch to or below a set quantity by a rotational speed control of the motor, before the second clutch transmitted torque capacity controller performs the lockup-condition second clutch control.

5. The hybrid vehicle control apparatus as claimed in claim 1, wherein the lockup controller includes an output limiting part configured to limit an output torque of the motor along with the control of the transmitted torque capacity of the second clutch by the second clutch transmitted torque capacity controller, during the lockup operation.

6. The hybrid vehicle control apparatus as claimed in claim 5,
wherein the lockup controller performs a slip convergence operation to converge a slip quantity of the second clutch to or below a set quantity by a rotational speed control of the motor, before the second clutch transmitted torque capacity controller performs the lockup-condition second clutch control, and
wherein the lockup controller configured to:
perform the slip convergence operation in response to a condition that the slip quantity of the second clutch becomes smaller than or equal to a predetermined first threshold value; and
thereafter perform the lockup-condition second clutch control and the output limiting by the output limiting part in response to a condition that the slip quantity becomes smaller than or equal to a second threshold value smaller than the first threshold value.

7. The hybrid vehicle control apparatus as claimed in claim 1, further comprising:
an engine start controller configured to perform an engine start operation,
wherein the engine start operation includes:
starting the engine from an electrical vehicle (EV) mode, wherein the EV mode allows driving by a driving torque of the motor with the first clutch disengaged and the second clutch engaged, by bringing the first clutch into slip-engaged state, and allowing the second clutch to slip, and increasing the driving torque of the motor; and
thereafter controlling the first clutch and the second clutch into completely engaged state; and
wherein the lockup controller configured to perform the lockup operation, when the engine start controller controls the second clutch into completely engaged state after the starting of the engine.

* * * * *